United States Patent
Kim et al.

(10) Patent No.: US 9,384,209 B2
(45) Date of Patent: Jul. 5, 2016

(54) VIRTUAL FILE SYSTEM INTEGRATING MULTIPLE CLOUD STORAGE SERVICES AND OPERATING METHOD OF THE SAME

(71) Applicant: POSTECH ACADEMY—INDUSTRY FOUNDATION, Gyeongbuk (KR)

(72) Inventors: Jong Kim, Gyeongsangbuk-do (KR); Young Kyun Park, Daegu (KR)

(73) Assignee: POSTECH ACADEMY—INDUSTRY FOUNDATION, Gyeongbuk (KR)

( * ) Notice: Subject to any disclaimer, the term of this patent is extended or adjusted under 35 U.S.C. 154(b) by 212 days.

(21) Appl. No.: 14/102,306

(22) Filed: Dec. 10, 2013

(65) Prior Publication Data
US 2014/0164449 A1 Jun. 12, 2014

(30) Foreign Application Priority Data
Dec. 10, 2012 (KR) .................. 10-2012-0142754

(51) Int. Cl.
G06F 7/04 (2006.01)
G06F 17/30 (2006.01)
G06F 9/50 (2006.01)

(52) U.S. Cl.
CPC ........ *G06F 17/30233* (2013.01); *G06F 9/5005* (2013.01)

(58) Field of Classification Search
CPC G06F 3/0604; G06F 17/30233; G06F 9/5005
See application file for complete search history.

(56) References Cited

U.S. PATENT DOCUMENTS

| | | | | |
|---|---|---|---|---|
| 8,799,322 B2* | 8/2014 | deMilo | ............. | G06F 17/30082 707/791 |
| 2010/0010944 A1* | 1/2010 | Cheng | ............... | G06F 17/30032 706/12 |
| 2010/0325199 A1* | 12/2010 | Park | .................. | G06F 17/30067 709/203 |
| 2013/0246923 A1* | 9/2013 | Iwai | ........................ | H04L 41/22 715/736 |

OTHER PUBLICATIONS

"An Automated Approach to Cloud Storage Service Selection," Ruiz-Alvarez et al, ScienceCloud '11, Jun. 8, 2011, San Jose, CA, retrieved from http://www.cs.virginia.edu/~ar5je/sci705-ruiz-alvarez.pdf on Sep. 4, 2015.*
Smit et al, "A Web Service for Cloud Metadata," 2012 IEEE Eighth World Congress on Services, Jun. 24-29, 2012, retrieved on Feb. 26, 2016 from http://ieeexplore.ieee.org/xpls/abs_all.jsp?arnumber=6274006.*

* cited by examiner

*Primary Examiner* — Bruce Moser
(74) *Attorney, Agent, or Firm* — Osha Liang LLP

(57) ABSTRACT

Disclosed is a virtual file system integrating and managing multiple cloud storages. A virtual file system may comprise an API database storing information on open API of the cloud storages, a storage state database storing state information of the cloud storages, a metadata database storing metadata of the cloud storages, a cloud storage allocation part receiving an user request and selecting a cloud storage appropriate for the user request among the cloud storages by referring to the storage state database and the metadata database, and an API mapping part reading out open API information of the cloud storage selected by the cloud storage allocation part from the API database, converting the user request to an open API of the selected cloud storage, and transferring the converted open API to the selected cloud storage.

19 Claims, 4 Drawing Sheets

VIRTUAL FILE SYSTEM INTEGRATING MULTIPLE CLOUD STORAGE SERVICES AND OPERATING METHOD OF THE SAME

CLAIM FOR PRIORITY

This application claims priorities to Korean Patent Application No. 10-2012-0142754 filed on Dec. 10, 2012 in the Korean Intellectual Property Office (KIPO), the entire contents of which are hereby incorporated by references.

BACKGROUND

1. Technical Field

Example embodiments of the present invention relate to a file system, and more specifically to a method for providing a file system environment integrating multiple cloud storages by mapping multiple cloud storage services supporting open API to POSIX interfaces, and a file system using the method.

2. Related Art

Commercial could storage service vendors provide users with browsing tools for the users to use their cloud storage services, and the browsing tools may be classified into three types as follows.

A first type of the browsing tools is a web interface operating on web browser without installing a separate program in system of the users. A second type of the browsing tools is an application (app) which operates in mobile terminal of the users for accessing cloud storage. A third type of the browsing tools is a program for mount and synchronization which can provide the same interface as that of local storages such as a file explorer and the like.

Also, most of commercial cloud storage services may provide open application programming interfaces (Open API) for users or companies wanting to provide a third party service to develop applications using the commercial cloud storage services.

The open APIs usually perform communications with the cloud storages by using Representational State Transfer (REST) or Simple Object Access Protocol (SOAP) interfaces with Extensible Markup Language (XML) or Javascript Object Notation (JSON) format of data. Such the open API may basically provide a function of uploading files in the cloud storage, a function of downloading files stored in the cloud storages, a function of creating new folders, and a function of deleting files or folders in the cloud storages. Also, a function of retrieving meta data such as creation dates of the stored folders and files and sizes of them may be provided, and any other extended functions may be provided according to their services.

The mount and synchronization program which can be installed in a personal computer of the user may operate by mapping POSIX interfaces to open API of the cloud storage service. That is, when the user wants to copy specific files of local storage to cloud storage, system calls 'open', 'read', 'write', and 'release' of the POSIX interface may be converted to corresponding APIs of the cloud storage service, and the converted requests may be provided to a server of the cloud storage service.

However, when a plurality of cloud storage services are used, browsing programs dedicated for each cloud storage service should be developed and managed respectively. For example, when two cloud storage services (service A and service B) are supposed to be used and the user wants to copy or move a file stored in the service A to the service B, there has been an inconvenience that the user should download the specific file to local storage by executing a browsing program for the service A and upload the downloaded specific file to the service B by executing a browsing program for the service B.

That is, direct move or replication of data between difference cloud storages is impossible, and so the inconvenience that the user should manually perform downloading and uploading exists. In addition, the user should check spaces remaining in respective cloud storage and upload/download performance of the respective cloud storage before performing downloading and uploading. Also, when a synchronization function of the dedicated browsing program is executed, there may be a problem that the same size of space accommodating stored data in cloud storage is needed in a local storage.

SUMMARY

Accordingly, example embodiments of the present invention are provided to substantially obviate one or more problems due to limitations and disadvantages of the related art.

Example embodiments of the present invention provide an integrated virtual file system which can provide an integrated virtual file system environment by integrating multiple cloud storages.

Example embodiments of the present invention also provide an operation method of an integrated virtual file system which can provide an integrated virtual file system environment by integrating multiple cloud storages.

In some example embodiments, a virtual file system integrating and managing multiple cloud storages may comprise an API database storing information on open API of the cloud storages, a storage state database storing state information of the cloud storages, a metadata database storing metadata of the cloud storages, a cloud storage allocation part receiving an user request and selecting a cloud storage appropriate for the user request among the cloud storages by referring to the storage state database and the metadata database, and an API mapping part reading out open API information of the cloud storage selected by the cloud storage allocation part from the API database, converting the user request to an open API of the selected cloud storage, and transferring the converted open API to the selected cloud storage.

Here, the virtual file system may further comprise an information collecting part collecting the information on open API, the metadata, and the state information of the cloud storages, and storing the information on open API, the metadata, and the state information of the cloud storages in the API database, the storage state database, and the metadata database.

Also, the information collecting part may collect the information on open API of the cloud storages by referring to API description files of the cloud storages.

Also, the information collecting part may collect the metadata, and the state information by calling API of respective cloud storage of the cloud storages through the API mapping part.

Here, the user request may be based on a specification of Portable Operating System Interface (POSIX).

Here, the state information may include at least one of information on total capacity of corresponding cloud storage, information of used capacity of corresponding cloud storage, and information on upload or download performance of corresponding cloud storage.

Here, the metadata may include at least one of information on names of files or folders existing in corresponding cloud storage, information on creation dates and/or modification dates of files or folders existing in corresponding cloud storage, information on size and directory path of files or folders existing in corresponding cloud storage.

Here, the virtual file system may further comprise a usage pattern monitoring part monitoring usage pattern of the file system by users, and a performance monitoring part monitoring performances of the cloud storages, wherein the cloud storage allocating part may select the cloud storage appropriate for the user request based on information provided from the usage pattern monitoring part and the performance monitoring part.

Here, the cloud storage allocation part may select a cloud storage having a best upload performance monitored by the performance monitoring part as the cloud storage appropriate to the user request, when an access type of an objective file of the user request monitored in the usage pattern monitoring part is a type in which the objective file is more frequently uploaded than downloaded.

Here, the cloud storage allocation part may select a cloud storage having a best download performance monitored by the performance monitoring part as the cloud storage appropriate for the user request, when an access type of an objective file of the user request monitored in the usage pattern monitoring part is a type in which the objective file is more frequently downloaded than uploaded.

In other example embodiments, a method of operating a virtual file system integrating and managing multiple cloud storages may comprise initializing at least one database storing information on open API, state information, and metadata of the cloud storages, monitoring usage pattern of the file system by users and performances of the cloud storages, receiving a user request and selecting a cloud storage appropriate to the user request among the cloud storages by referring to the state information and the metadata stored in the at least one database and to the usage pattern of the file system and the performances of the cloud storages, and converting the user request to an open API of the selected cloud storage by referring the information on open API stored in the at least one database and transferring the converted open API to the selected cloud storage.

Here, the initializing at least one database may comprise collecting the information on open API, the metadata, and the state information of the cloud storages and storing the information on open API, the metadata, and the state information of the cloud storages are stored in the at least one database.

Also, the information on open API of the cloud storages may be collected by referring to API description file of the cloud storage.

Also, the metadata and the state information may be collected by calling API of respective cloud storage of the cloud storages.

Also, the user request may be based on a specification of Portable Operating System Interface (POSIX).

Here, the state information may include at least one of information on total capacity of corresponding cloud storage, information of used capacity of corresponding cloud storage, and information on upload or download performance of corresponding cloud storage.

Here, the metadata may include at least one of information on names of files or folders existing in corresponding cloud storage, information on creation dates and/or modification dates of files or folders existing in corresponding cloud storage, information on size and directory path of files or folders existing in corresponding cloud storage.

Here, a cloud storage having a best upload performance monitored may be selected as the cloud storage appropriate for the user request, when an access type of an objective file of the user request monitored is a type in which the objective file is more frequently uploaded than downloaded.

Here, a cloud storage having a best download performance monitored may be selected as the cloud storage appropriate for the user request, when an access type of an objective file of the user request monitored is a type in which the objective file is more frequently downloaded than uploaded.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
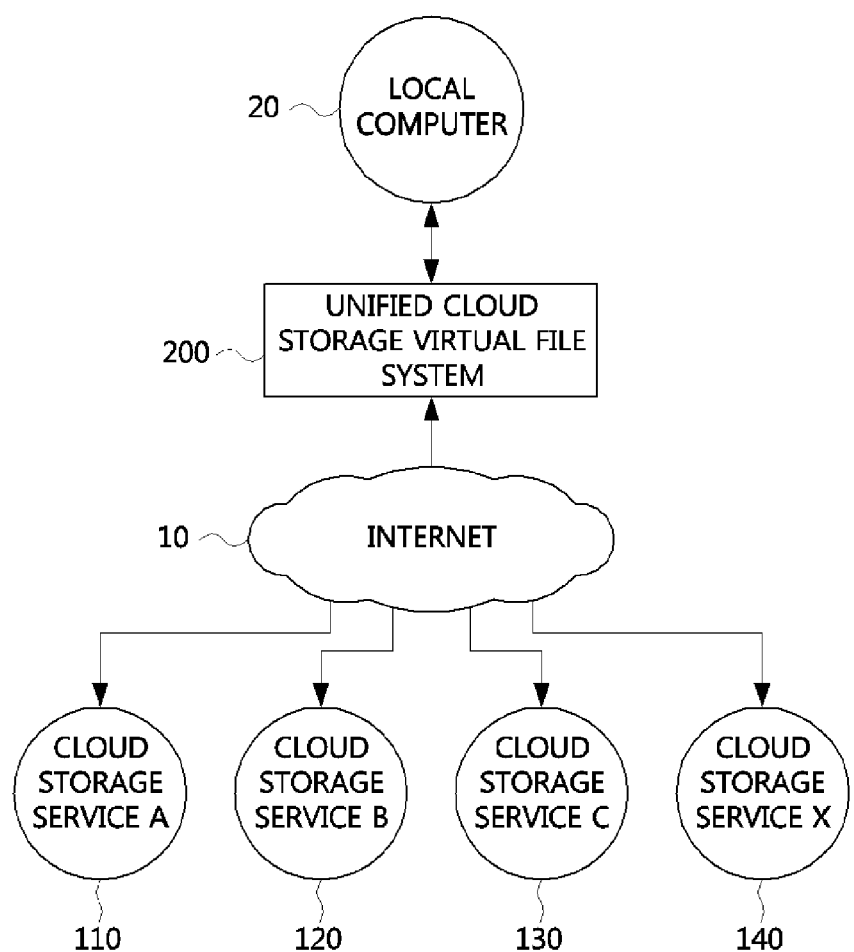
FIG. 1 is a conceptual diagram to explain an operation environment of a unified cloud storage virtual file system according to the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Operation Environment of Integrated Virtual File System

FIG. 1 is a conceptual diagram to explain an operation environment of a unified cloud storage virtual file system according to the present invention.

Referring to FIG. 1, multiple cloud storages 110, 120, 130, and 140 exist. The multiple cloud storages may include cloud storages according to commercial cloud storage services and non-commercial cloud storages. It is not required that the cloud storages are newly developed or modified for cooperating with a unified virtual file system 200 according to the present invention. The cloud storages may be configured to provide users with services through at least one of the three types of browsing tools such as the web interfaces, the dedicated app, and the mount and synchronization program.

On the other hand, the cloud storages should provide open APIs for the unified virtual file system 200 to access them. However, the open API provided from the cloud storages are not required to be standardized, and so each of the cloud storages may have its unique open API.

The cloud storages 110, 120, 130, and 140 may be connected to the unified virtual file system 200 according to the present invention through an internet 10. An user may access the virtual file system 200 via their local computer, and the virtual file system may be configured to convert requests of the user transferred via the local computer 20 into API of the multiple cloud storages 110, 120, 130, and 140, and transfer the requests to the cloud storages by calling the converted API. That is, we can understand that the virtual file system 200 provides the local computer 20 with abstraction on multiple cloud storages existing in the lower side.

In the conventional environment which the virtual file system 200 does not exist, the local computer 20 of the user should access the cloud storages 110, 120, 130, 140 directly through the internet 20. For example, the user should use at least one of the three type of browsing tools such as the web interfaces, the dedicated app, and the mount and synchronization program.

However, in the case of the virtual file system 200 according to the present invention, the local computer 20 may operate under a unified file system environment integrating storages of the multiple cloud storages provided by the virtual file system.

The local computer 20 may include a personal computer, a notebook (laptop) computer, a tablet, a smartphone and the like, that is, any computing device which can access the cloud storages via the internet and can use file upload/download services and synchronization service provided by the cloud storage services.

Exemplary Constitution of Unified Cloud Storage Virtual File System

Figure 2:
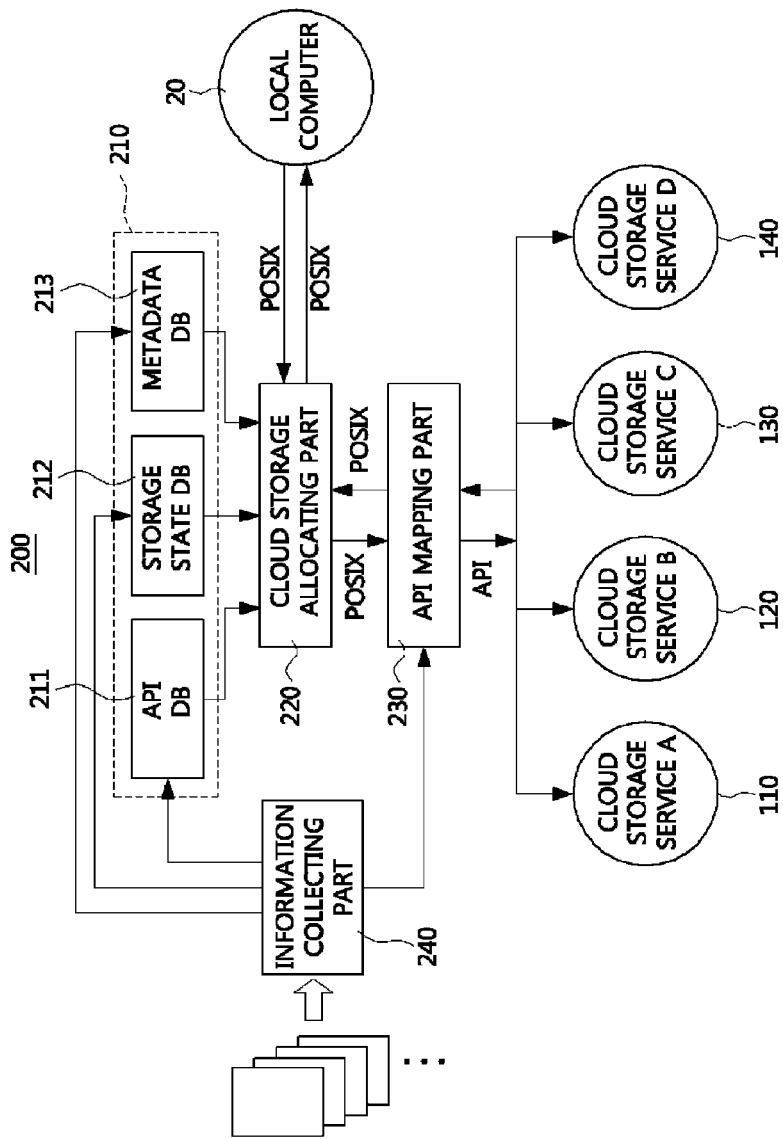
FIG. 2 is a block diagram to explain an example embodiment of a unified cloud storage virtual file system according to the present invention.

FIG. 2 is a block diagram to explain an example embodiment of a unified cloud storage virtual file system according to the present invention.

Referring to FIG. 2, an example embodiment of a unified cloud storage virtual file system according to the present invention may include an API database 211, a storage state database 212, a metadata database 213, a cloud storage allocating part 220, and an API mapping part 230.

Meanwhile, the unified cloud storage virtual file system may further comprise an information collecting part 240 as an additional component collecting information to be stored in the databases 211, 212, and 213. The detail role of the information collecting part 240 will be explained later.

First, databases referred by the unified cloud storage virtual file system during operation of the unified cloud storage virtual file system may include the API database 211, the storage state information 212, and the metadata database 213.

The API database 211 is a component storing service name and information on APIs performing file uploading, file downloading, folder creation, file deleting, metadata reading for each cloud storage of the multiple cloud storages 110, 120, 130, and 140.

The metadata database 213 is a component storing metadata for the multiple cloud storages 110, 120, 130, and 140 which are being managed by the virtual file system 200. The metadata may mean names, sizes, creation and modification dates, and whole director paths of files and folders stored in each of the cloud storages.

At last, the storage state database 212 is a component storing state information of each cloud storage. The state information may include information on total capacities, used capacities, performance information (for example, upload speed or download speed) of each cloud storage. Since the information related to the total capacity and used capacity of each cloud storage is information which can be obtained by analyzing the above described metadata information, the metadata database may be configured to take a role of the storage state database in addition to a role of the metadata base.

Here, the above databases do not necessarily be implemented as separate physical entities. That is, the name of each database is entitled only according to purposes, types, and formats of information stored in each database. That is, the three databases may be integrated into a single database, or one of the three databases may take a role of another database of the three databases. Also, the term 'database' in the specification does not necessarily indicate a rigid form of database such as a relational database and an object-oriented database, and may mean a functional component which can store information. Thus, the databases may be implemented as simple storages such as file bases.

Meanwhile, when the unified cloud storage virtual file system according to the present invention is initialized, it is possible that the databases are not constructed yet. Therefore, the additional component, the information collecting part 240 may collect information for the databases, construct the above databases through a database management system (DBMS), and store the collected information in the constructed databases.

The information collecting part 240 may register APIs for each cloud storage in the API database 211 by referring to API description files describing APIs provided from each cloud storage service vendor or written by user. The registered APIs may include APIs for reading service name of each cloud storage service, uploading files to each cloud storage, downloading files from each cloud storage, creating new folder in each cloud storage, deleting files in each cloud storage, and reading metadata. The information collecting part 240 may collect information on APIs provided by each cloud storage service in a way other than the way of referring to the API description files.

The information collecting part 240 may collect metadata information (names of files or folders, sizes of files or folders, creation or modification dates of files or folders, whole directory paths of files or folders) after performing authentication procedures for all cloud storages registered in the API database 211. At this time, the information collecting part 240 may search an API of each cloud storage for requesting metadata of each cloud storage in the API database 211, and use the searched APIs to request metadata of each cloud storage.

Here, metadata provided by each cloud storage may have similar data formats. However, they have different formats for each cloud storage. In this case, the metadata having different formats may be integrated to have a unified metadata format, and stored in the metadata database 213. Also, in order to identify relations between folders and between files and folders, unified whole directory paths of each file and each folder may be stored in the metadata database 213 so that a unified virtual file system environment can be provided to the user.

After the information collecting part 240 collects metadata information, state information of each cloud storage such as total capacity and used capacity of each cloud storage may be identified, and the state information for each cloud storage may be registered to the storage state database 212.

Second, the cloud storage allocating part 220 is a component configured to receive a user request from a local computer 20, and select a cloud storage appropriate to the user request by referring to the storage state database 212 and the metadata database 213. At this time, the user request may be made based on standard interface according to Portable Operating System Interface (POSIX), and may be provided to the virtual file system according to the present invention (specifically to the cloud storage allocating part 220).

The cloud storage allocating part 220 may select the cloud storage appropriate to the user request in various manners. For example, in the case that the user request is for reading or writing a specific file, the cloud storage allocating part 220 may identify directory path of the specific file in a unified directory space provided by the virtual file system by referring to the metadata database 213, and select a cloud storage to which the identified directory path is mapped as the cloud storage appropriate to the user request. In addition, the cloud storage allocating part 220 may also select the cloud storage appropriate to the user request based on analysis results on usage pattern of the user and performances of each cloud storage. The above mentioned manner will be explained as another embodiment referring to FIG. 3.

Finally, the API mapping part 230 may receive the user request and information indicating the cloud storage appropriate to the user request from the cloud storage allocating part 220, convert the user request into API corresponding to the designated cloud storage, call the converted API, receive a response including a result of the API call, and transfer the response to the cloud storage allocating part 220.

At this time, the API mapping part 230 may perform mapping of the user request (for example, described in POSIX interface manner) to corresponding API of the designated cloud storage, convert the response of the designated cloud storage into a format which is understandable by the local computer (for example, described in POSIX), and transfer the converted response to the local computer 20 through the cloud storage allocating part 220.

For example, interfaces specified in POSIX and APIs of cloud storage may have one-to-one relationship or various m-to-n relationships. That is, a single POSIX interface may correspond to multiple APIs of cloud storage. That is, multiple POSIX interfaces may correspond to a single API of cloud storage. The API mapping part may have the information on the mapping relationship in itself in the forms of mapping tables or mapping scripts. Alternatively, the information on the mapping relationship may be stored in the API database 211.

Figure 3:
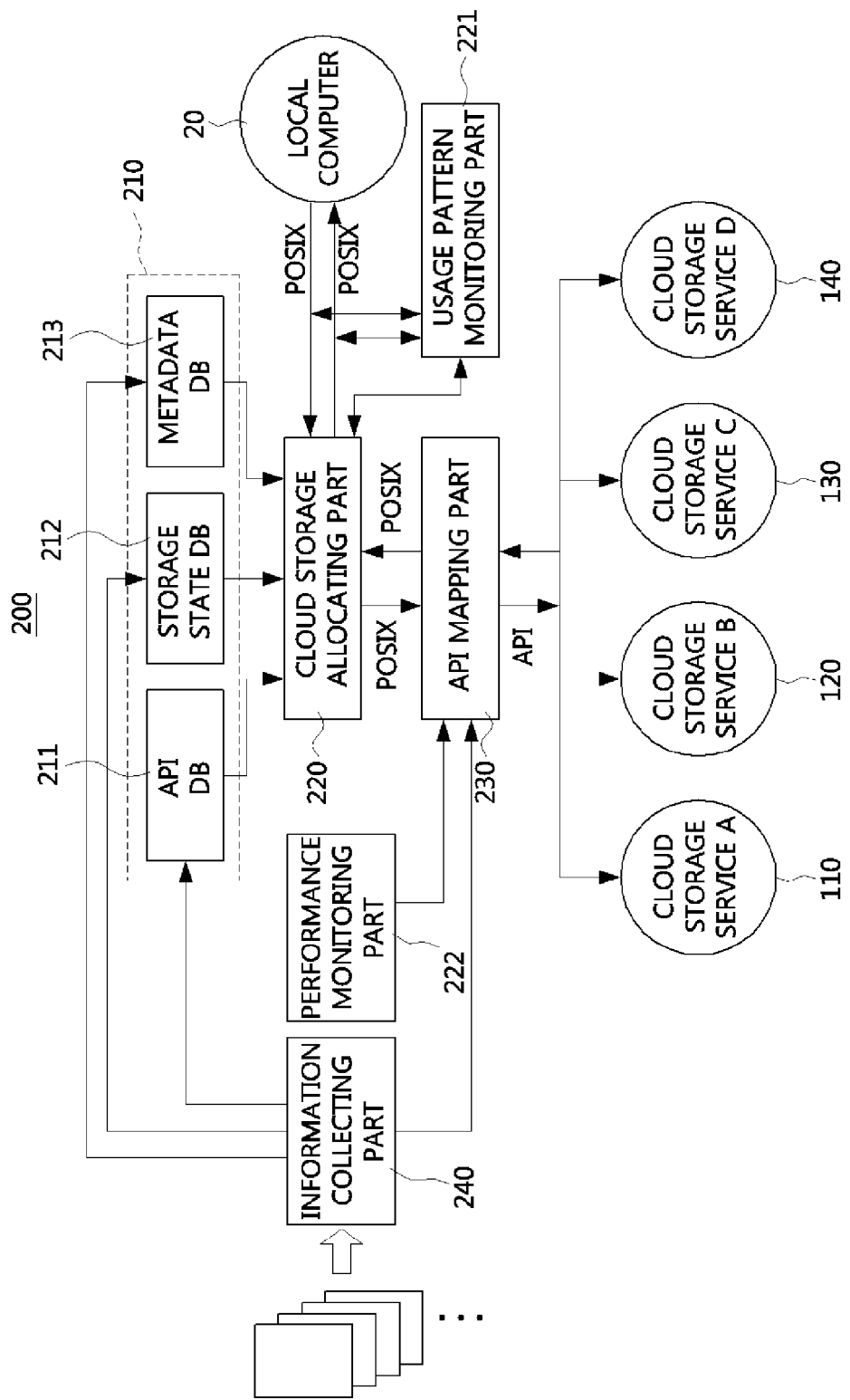
FIG. 3 is a block diagram to explain another example embodiment of a unified cloud storage virtual file system according to the present invention.

FIG. 3 is a block diagram to explain another example embodiment of a unified cloud storage virtual file system according to the present invention.

Referring to FIG. 3, another example embodiment of a unified cloud storage virtual file system may include an usage pattern monitoring part 211 and a performance monitoring part 222 as additional components to the example embodiment shown in FIG. 2.

Other components except the usage pattern monitoring part 211 and the performance monitoring part 222 in another example embodiment shown in FIG. 3 are the same as those of the example embodiment depicted in FIG. 2, and so redundant explanation will be omitted.

As described above, the cloud storage allocating part 220 may select a cloud storage appropriate to a user request in various manners. Thus, the usage pattern monitoring part 211 and the performance monitoring part 222 are additional components to provide information which can be used for the cloud storage allocating part 220 to select the cloud storage appropriate to a user request.

First, the usage pattern monitoring part 221 is a component for monitoring file system usage pattern of a user. For example, the usage pattern monitoring part 221 may record the number of reading or writing for each file type (for example, documents, multimedia contents, and general data and so on) when the use write or read a file.

The usage pattern monitoring part 221 may be configured to monitor the user request inputted from the local computer 20 and the response to the user request outputted to the local computer 20 directly, or may be configured to analyze the user request and the response indirectly transferred from the cloud storage allocating part 220.

Second, the performance monitoring part 222 may operate independently, and measure periodically or aperiodically (for example, according to user's demand) uploading speed and downloading speed by unloading and downloading a specific size of file to and from each cloud storage. The performance of each cloud storage may have a characteristic of changing according to area of the user and time of access. Therefore, the performance monitoring part 222 may be configured to measure performance of each cloud storage periodically or aperiodically performance of each cloud storage, and store the measured performance in the above storage state database.

Here, the performance monitoring part 222 may access the cloud storages 110, 120, 130, and 140 through the above described API mapping part 230.

An example of a procedure that the cloud storage allocating part 220 selects a cloud storage appropriate to the user request by using information provided from the additional components such as the usage pattern monitoring part and the performance monitoring part may be configured as follows.

Since file access patterns may be different according to preferences of the users, the cloud storage allocating part 220 may use usage pattern information of the users analyzed in the usage pattern monitoring part 221 so that a type of file which is more frequently uploaded than downloaded may be uploaded to a cloud storage having fast uploading speed, and a type of file which is more frequently downloaded than uploaded may be uploaded to a cloud storage having fast downloading speed.

For example, when a user copies or moves a specific file from the local system to the virtual file system, the cloud storage allocating part 220 may obtain information on access pattern of the specific file from the usage pattern monitoring part 221. The access pattern may be classified into three types such as a type having more uploading, a type having more downloading, and a type of having similar downloading and uploading.

For the type having more uploading, the cloud storage allocating part 220 may obtain information on a cloud storage having the fastest uploading speed from the performance monitoring part 222, and identify a remained space of the cloud storage having the fastest uploading speed. If the remained space is larger than a size of the specific file, the cloud storage allocating part 220 may select the cloud storage having the fastest uploading speed as a cloud storage appropriate to the user request, and process the user request on the cloud storage having through the API mapping part 230.

For the type having more downloading, the cloud storage allocating part 220 may obtain information on a cloud storage having the fastest downloading speed from the performance monitoring part 222, and identify a remained space of the cloud storage having the fastest downloading speed. If the remained space is larger than a size of the specific file, the cloud storage allocating part 220 may select the cloud storage having the fastest downloading speed as a cloud storage appropriate to the user request, and process the user request on the cloud storage having through the API mapping part 230.

For the type having similar downloading and uploading, the cloud storage allocating part 220 may select a cloud storage having the largest remained space as a cloud storage appropriate to the user request.

Meanwhile, for all the three types, if the remained space is smaller than a size of the specific file, the cloud storage allocating part 220 may obtain information on a cloud storage having the next performance (that is, the second fastest uploading/downloading speed or the second largest remained space) from the performance monitoring part 222, and select a cloud storage appropriate to the user request.

Operation Method of a Unified Cloud Storage Virtual File System

Figure 4:
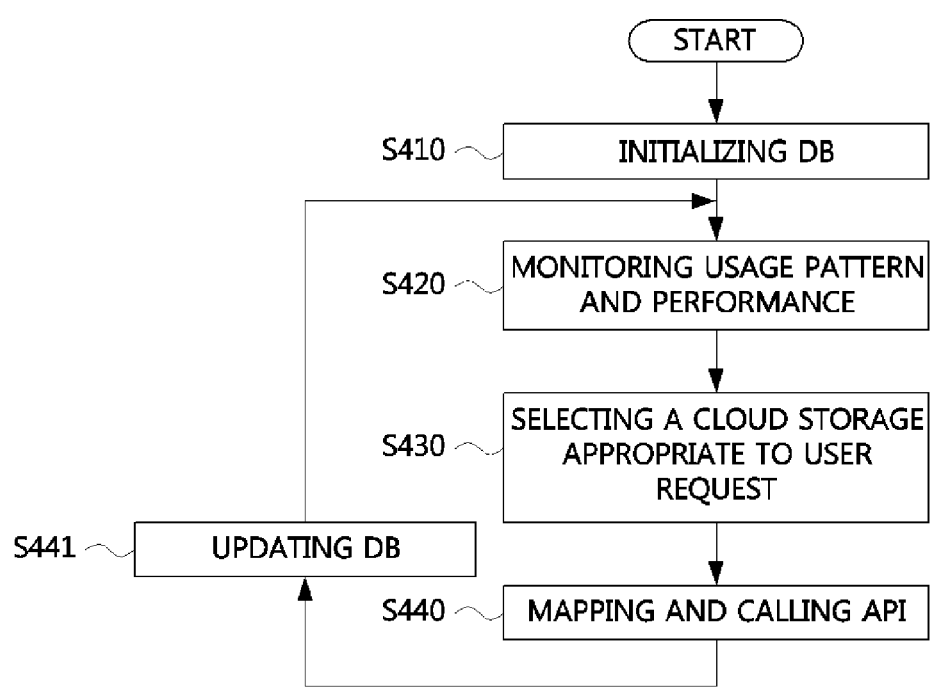
FIG. 4 is a flow chart to explain an operation method of a unified cloud storage virtual file system according to the present invention

FIG. 4 is a flow chart to explain an operation method of a unified cloud storage virtual file system according to the present invention.

Referring to FIG. 4, an operation method of a unified cloud storage virtual file system according to the present invention may include a step S410 of initializing database, a step S420 of monitoring usage pattern and performance, a step S430 of selecting a cloud storage appropriate to a user request, and a step S440 of mapping and calling API.

In a below explanation of the specification, each step constituting an operation method of virtual file system of the present invention may be understood as an operation of corresponding component, but each step constituting an operation method should be limited only by each function defining each step. That is, an entity performing each step should not be limited by a name of the entity which is used in this specification.

First, the step S410 of initializing database is a step of initializing at least one database storing information used in the virtual file system according to the present invention.

That is, when the virtual file system is started, the virtual file system may check whether each database already exists or not, and start initializing each database if the corresponding database does not exist. The explanation of purpose and meaning of each database is omitted since they have been explained above.

In the step of initializing database, a step of collecting information may be additionally performed.

In the step of collecting information, API description file of each cloud storage service is read out. For each cloud storage service, a service name and APIs for file uploading, file downloading, folder creation, file or folder deleting, and metadata reading may be registered to the API database 211 based on the API description file of each cloud storage service. Also, in the step of collecting information, authentication procedures on all the cloud storages registered to the API database may be performed, and then metadata information such as names, sizes, creation/modification dates, whole directory paths of files and folders may be collected. In collecting the metadata information, an API for requesting metadata searched in the API database may be used to request the metadata for each cloud storage.

At this time, although metadata of each cloud storage may have similar data formats, they may have also different data formats for each cloud storage. In this case, the virtual file system may unify formats of metadata of the cloud storages into a unified format, and store metadata of the cloud storages in the metadata database. Also, in order to identify relations between folders and between files and folders, unified whole directory paths of each file and each folder may be stored in the metadata database 213 so that a unified virtual file system environment can be provided to the user. After the metadata information is collected, total capacity and used capacity of each cloud storage may be identified, and the state information for each cloud storage may be registered to the storage state database 212.

Second, in the step S420 of monitoring usage pattern and performance, a file system access pattern of the users and performances of the cloud storages may be monitored and analyzed. The step S420 may be performed in periodical or aperiodical manner independently to other steps.

That is, in the step S420 of monitoring usage pattern and performance, uploading speed and downloading speed for each cloud storage may be monitored by unloading and downloading a specific size of file to and from each cloud storage. Also, the number of reading or writing for each file type (for example, documents, multimedia contents, and general data and so on) may be monitored when the use write or read a file.

The step S420 may be performed by the performance monitoring part 211 and the usage pattern monitoring part 212 of the virtual file system 200 as explained above.

Second, the step S430 of selecting a cloud storage appropriate to a user request is a step of receiving the user request to the virtual file system and selecting a cloud storage appropriate to the user request.

For example, after the step S410 of initializing, if the user inputs a request of searching folders and files in the unified virtual file system, the virtual file system may search and show files and folders located in corresponding directory paths found out in the metadata database.

The user may transfer a user request such as copying or moving a specific file from the local system to the virtual file system to the virtual file system. In the step S430, the user request may be received, and a cloud storage appropriate to the user request may be selected according to an access type of the specific file.

At this time, the step S430 may be performed based on file access pattern information of the user identified in the step S420 of monitoring.

For example, the access pattern on the specific file may be classified into three types such as a type having more uploading, a type having more downloading, and a type of having similar downloading and uploading.

For the type having more uploading, in the step S430, a cloud storage having the fastest uploading speed may be identified, and a remained space of the cloud storage having the fastest uploading speed may be identified in the storage state database. If the remained space is larger than a size of the specific file, the cloud storage having the fastest uploading speed may be selected as a cloud storage appropriate to the user request.

For the type having more downloading, in the step S430, a cloud storage having the fastest downloading speed may be identified, and a remained space of the cloud storage having the fastest downloading speed may be identified in the storage state database. If the remained space is larger than a size of the specific file, the cloud storage having the fastest downloading speed may be selected as a cloud storage appropriate to the user request.

For the type having similar downloading and uploading, a cloud storage having the largest remained space may be selected as a cloud storage appropriate to the user request.

For all the three types, if the remained space is smaller than a size of the specific file, a cloud storage having the next performance (that is, the second fastest uploading/downloading speed or the second largest remained space) may be identified and selected as a cloud storage appropriate to the user request.

Finally, in the step S440 of mapping and calling API, the user request may be converted into an API corresponding to the designated (selected) cloud storage based on the user request received and information on the cloud storage selected in the step S430, and the user may be transferred to the selected cloud storage by calling the API. Then, a response to the user request may be received from the selected cloud storage.

The procedures performed in the step 440 of mapping and calling API are similar to the above explained procedures performed by the API mapping part 230, and so redundant explanation may be omitted.

Then, the databases may be updated by reflecting metadata and states of the selected cloud storage changed according to the user request at S441, and the steps may be repeatedly performed from the step S420 of monitoring usage pattern and performance.

The virtual file system mapping multiple cloud storage services supporting open APIs to POSIX interfaces, which is proposed according to the present invention, may provide a unified virtual file system environment integrating multiple cloud storage services to users as opposed to that the conventional mount and synchronization program operates only on a single cloud storage.

The proposed virtual file system may analyze access patterns of users for each file type, monitor performances of cloud storages integrated, and select an optimal cloud storage automatically based on a user request and the analyzed and monitored result.

While the example embodiments of the present invention and their advantages have been described in detail, it should be understood that various changes, substitutions and alterations may be made herein without departing from the scope of the invention.

What is claimed is:

1. An apparatus for executing a virtual file system integrating and managing multiple cloud storages, the apparatus comprising at least one processor executing program code for the virtual file system and a memory storing the program codes, wherein the apparatus further comprises:
   an API database storing information on open API of the cloud storages;
   a storage state database storing state information of the cloud storages; and
   a metadata database storing metadata of the cloud storages, wherein the program code comprises:
      a cloud storage allocation part receiving an user request and selecting a cloud storage appropriate for the user request among the cloud storages by referring to the storage state database and the metadata database; and
      an API mapping part reading out open API information of the cloud storage selected by the cloud storage allocation part from the API database, converting the user request to an open API of the selected cloud storage, and transferring the converted open API to the selected cloud storage,
   wherein the virtual file system unifies formats of the metadata of the cloud storages into a unified format, and provides a unified virtual file system environment by providing whole directory paths of each file and each folder of the cloud storages.

2. The apparatus of the claim 1, wherein the program code further comprises an information collecting part collecting the information on open API, the metadata, and the state information of the cloud storages, and storing the information on open API, the metadata, and the state information of the cloud storages in the API database, the storage state database, and the metadata database.

3. The apparatus of the claim 2, wherein the information collecting part collects the information on open API of the cloud storages by referring to API description file of the cloud storage.

4. The apparatus of the claim 2, wherein the information collecting part collects the metadata, and the state information by calling API of respective cloud storage of the cloud storages through the API mapping part.

5. The apparatus of the claim 1, wherein the user request is based on a specification of Portable Operating System Interface (POSIX).

6. The apparatus of the claim 1, wherein the state information includes at least one of information on total capacity of corresponding cloud storage, information of used capacity of corresponding cloud storage, and information on upload or download performance of corresponding cloud storage.

7. The apparatus of the claim 1, wherein the metadata includes at least one of information on names of files or folders existing in corresponding cloud storage, information on at least one of creation dates and modification dates of files or folders existing in corresponding cloud storage, information on size and directory path of files or folders existing in corresponding cloud storage.

8. The apparatus of the claim 1, wherein the program code further comprises an usage pattern monitoring part monitoring usage pattern of the file system by users, and a performance monitoring part monitoring performances of the cloud storages, wherein the cloud storage allocation part selects the cloud storage appropriate for the user request based on information provided from the usage pattern monitoring part and the performance monitoring part.

9. The apparatus of the claim 8, wherein the cloud storage allocation part selects a cloud storage having a best upload performance monitored by the performance monitoring part as the cloud storage appropriate for the user request, when an access type of an objective file of the user request monitored in the usage pattern monitoring part is a type in which the objective file is more frequently uploaded than downloaded.

10. The apparatus of the claim 8, wherein the cloud storage allocation part selects a cloud storage having a best download performance monitored by the performance monitoring part as the cloud storage appropriate for the user request, when an access type of an objective file of the user request monitored in the usage pattern monitoring part is a type in which the objective file is more frequently downloaded than uploaded.

11. A method of operating a virtual file system integrating and managing multiple cloud storages, comprising:
   initializing at least one database storing information on open API, state information, and metadata of the cloud storages;
   monitoring usage pattern of the virtual file system by users and performances of the cloud storages;

receiving a user request and selecting a cloud storage appropriate to the user request among the cloud storages by referring to the state information and the metadata stored in the at least one database and to the usage pattern of the virtual file system and the performances of the cloud storages; and converting the user request to an open API of the selected cloud storage by referring the information on open API stored in the at least one database and transferring the converted open API to the selected cloud storage, wherein the virtual file system unifies formats of the metadata of the cloud storages into a unified format, and provides a unified virtual file system environment by providing whole directory paths of each file and each folder of the cloud storages.

12. The method of the claim 11, wherein the initializing at least one database comprises collecting the information on open API, the metadata, and the state information of the cloud storages and storing the information on open API, the metadata, and the state information of the cloud storages are stored in the at least one database.

13. The method of the claim 12, wherein the information on open API of the cloud storages is collected by referring to API description file of the cloud storages.

14. The method of the claim 12, wherein the metadata and the state information are collected by calling API of respective cloud storage of the cloud storages.

15. The method of the claim 11, wherein the user request is based on a specification of Portable Operating System Interface (POSIX).

16. The method of the claim 11, wherein the state information includes at least one of information on total capacity of corresponding cloud storage, information of used capacity of corresponding cloud storage, and information on upload or download performance of corresponding cloud storage.

17. The method of the claim 11, wherein the metadata includes at least one of information on names of files or folders existing in corresponding cloud storage, information on at least one of creation dates and modification dates of files or folders existing in corresponding cloud storage, information on size and directory path of files or folders existing in corresponding cloud storage.

18. The method of the claim 11, wherein a cloud storage having a best upload performance monitored is selected as the cloud storage appropriate for the user request, when an access type of an objective file of the user request monitored is a type in which the objective file is more frequently uploaded than downloaded.

19. The method of the claim 11, wherein a cloud storage having a best download performance monitored is selected as the cloud storage appropriate for the user request, when an access type of an objective file of the user request monitored is a type in which the objective file is more frequently downloaded than uploaded.

* * * * *